(12) United States Patent
Grooss et al.

(10) Patent No.: US 11,441,535 B2
(45) Date of Patent: Sep. 13, 2022

(54) ROTOR BLADE FOR A WIND TURBINE

(71) Applicant: Siemens Gamesa Renewable Energy A/S, Brande (DK)

(72) Inventors: Tina Grooss, Vestbjerg (DK); Ashish Pawar, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 197 days.

(21) Appl. No.: 16/869,269

(22) Filed: May 7, 2020

(65) Prior Publication Data

US 2020/0355155 A1 Nov. 12, 2020

(30) Foreign Application Priority Data

May 9, 2019 (EP) .................................... 19173547

(51) Int. Cl.
*F03D 1/06* (2006.01)

(52) U.S. Cl.
CPC ......... *F03D 1/0633* (2013.01); *F03D 1/0675* (2013.01); *F05B 2240/21* (2013.01); *F05B 2280/4002* (2013.01); *F05B 2280/4003* (2013.01)

(58) Field of Classification Search
None
See application file for complete search history.

(56) References Cited

U.S. PATENT DOCUMENTS

| 9,541,061 B2 * | 1/2017 | Sievers .................. F03D 1/0675 |
| 10,107,258 B2 | 10/2018 | Quiring et al. |
| 2015/0204200 A1 * | 7/2015 | Eyb ........................ F03D 1/0683 416/230 |

FOREIGN PATENT DOCUMENTS

| CN | 104696167 A * | 6/2015 | |
| EP | 3299613 A1 | 3/2018 | |
| EP | 3418558 A1 | 12/2018 | |
| WO | WO-2018104076 A1 * | 6/2018 | ........... F03D 1/0675 |

OTHER PUBLICATIONS

European Search Report and Written Opinion of the European Searching Authority dated Nov. 7, 2019 for Application No. 19173547.1.

* cited by examiner

*Primary Examiner* — Kayla Mccaffrey
(74) *Attorney, Agent, or Firm* — Schmeiser, Olsen & Watts LLP

(57) ABSTRACT

Provided is a rotor blade for a wind turbine, with a trailing edge including a trailing edge core having several core elements arranged side by side, and with an inner and an outer laminate, wherein one core element is split into two element parts separated by a slit, whereby, seen in the direction from a blade root to a blade tip, the inner laminate runs into and through the slit and becomes the outer laminate.

13 Claims, 5 Drawing Sheets

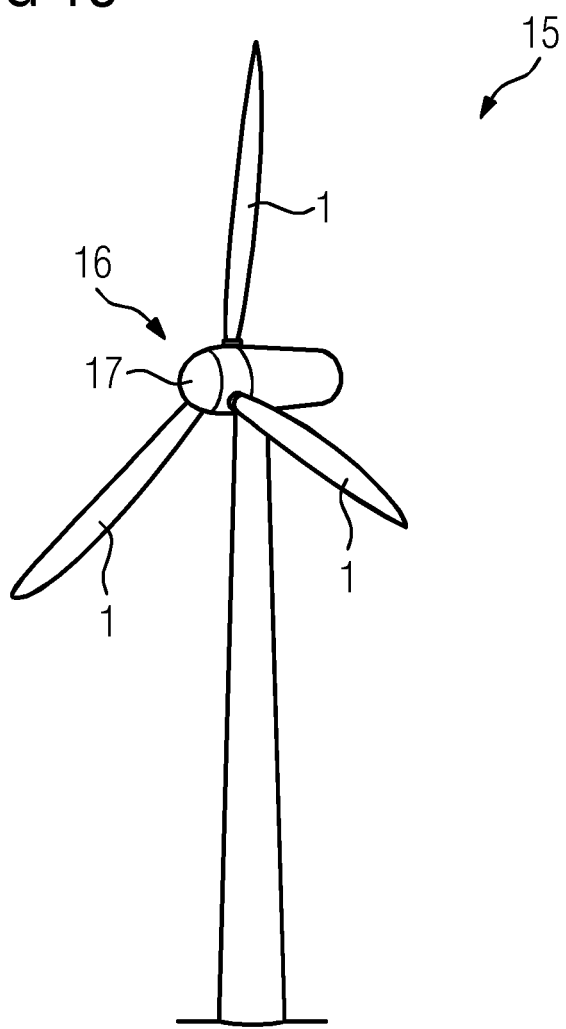

ROTOR BLADE FOR A WIND TURBINE

CROSS-REFERENCE TO RELATED APPLICATIONS

This application claims priority to EP Application No. 19173547.1, having a filing date of May 9, 2019, the entire contents of which are hereby incorporated by reference.

FIELD OF TECHNOLOGY

The following relates to a rotor blade for a wind turbine, with a trailing edge comprising a trailing edge core having several core elements arranged side by side, and with an inner and an outer laminate.

BACKGROUND

During operation of a wind turbine the rotor blades directly interact with the wind driving the wind turbine. The rotor blades have a specific blade geometry, starting with a cylindrical geometry at the root, with which the rotor blade is attached to a hub, and changing towards the tip from this cylindrical geometry to a very flat air foil geometry. Each rotor blade comprises a leading edge directed to the rotation direction, and a trailing edge at the opposite side. Especially the trailing edge undergoes a strong geometry change along the blade length, starting with round a geometry at the root changing to a flatback geometry and sharp training edge towards the tip. So the design of the trailing edge strongly varies.

Especially in integral blades, which are formed as a hollow one-piece blade in a respective mould, the trailing edge design is realised by means of a trailing edge core which is integrated into the blade while manufacturing it in the mould. The trailing edge core comprises several core elements which are, seen in the longitudinal direction of the blade, arranged side by side and which define the specific geometry. During the production process laminates comprising composite fiber mats and a very light blade construction are used and arranged in the mould together with the trailing edge elements, which parts are then infused with a resin for firmly fixing all parts together and for providing the respective stability of the rotor blade. The laminate is an inner laminate arranged at the inner surface of the hollow blade. This is easily possible in blade sections having a larger cross section and a larger radius at the inner blade surface. But in sections closer or close to the tip, the blade cross section is so small in the area of the trailing edge, which then becomes very flat, that it is no longer possible to arrange the inner laminate. In these regions the fiber web laminates are arranged as an outer laminate at the outside of the blade. As the trailing edge core extends along the trailing edge, there is an area of discontinuity, where the inner laminate ends and the outer laminate begins. In this area the inner laminate is ramped down, while the outer laminate is ramped up, while, seen in the cross sectional view, the laminates may overlap over a certain length. Due to this discontinuity, where is no direct connection of the inner laminate to the outer laminate, the mechanical stability of the blade gets worse. In the transfer region, where this mechanical discontinuity is given, the transfer of higher loads is restricted due to the strength of the core material.

SUMMARY

An aspect relates to provide an improved rotor blade.

Embodiments of the invention propose a rotor blade for a wind turbine as mentioned above, which is characterised in that one core element is split into two element parts separated by a slit, whereby, seen in the direction from a blade root to a blade tip, the inner laminate runs into and through the slit and becomes the outer laminate.

Embodiments of the invention propose a very specific trailing edge core comprising a one split core element made of two element parts, which are separated by a slit. This slit accommodates the laminate in the transition region. In the region from the root to the transition area this laminate is the inner laminate attached to the inner side of the blade. In the transition region this inner laminate runs into the slit and through the slit, which slit starts at the inside and ends at the outside of the blade respectively the trailing edge core respectively the split core element. When exiting the slit the laminate now is the outer laminate, which is from now on attached to the outer side of the blade.

Due to the integration of the inventive split core element it is possible to continuously transfer the inner laminate to the outer laminate. This allows to maintain the high mechanical stability provided by the fiber mats laminate, which is a continuous mechanical structure and which therefore also provides in the transition area a high mechanical stability. Also the transition region is very small, as such a split core element has a length of approximately 1-1.5 m. Compared to a transition region at blades manufactured according to the conventional art of 4-5 m for midsized blades, which transition region will be much longer for larger sized blades, the transition region, which can be realised by means of embodiments of the invention, is way smaller, and thus any mechanical influence due to the transition from the inner to the outer laminate is neglectable.

Further the inventive transfer by means of the split core element allows a simplified production, as all layers of the laminate are transferred at once instead of ramping down and ramping up the separate layers in the way of producing conventional art blades.

The slit extends oblique to the longitudinal axis of the core element. This allows a smooth transition without sharper bending edges of the laminate.

The slit starts at or close to one end surface and extends to or close to the other end surface. The longer the element respectively the slit, which has a length of 0.5-2 m, especially of 1-1.5 m, the smaller the transition angle and the smoother the transition.

The slit is curved, seen in the cross sectional view of the blade. Also this curved slit geometry allows to smoothly guide the laminate through the slit without sharper bending edges.

For tightly packaging the two split core elements and the web laminate inserted in the slit during the lamination respectively infusing process with a resin, the opposing surfaces of the two element parts correspond to each other in a form-fit manner. As the surfaces are parallel to each other, the laminate sandwiched between the split core elements and the infused resin matric have the same thickness throughout the whole slit.

The core elements itself are made of a polymer, especially polyurethane, but they can also be made of other material, wood like balsa wood.

Aside from the rotor blade embodiments of the invention also relate to a wind turbine, comprising a rotor with one or more rotor blades as depicted above.

Other features of embodiments of the present invention will become apparent from the following detailed description considered in conjunction with the accompanying drawings. The drawings, however, are only principle sketches designed solely for the purpose of illustration and do not limit embodiments of the invention.

BRIEF DESCRIPTION

Some of the embodiments will be described in detail, with reference to the following figures, wherein like designations denote like members, wherein:

FIG. 13 shows a principle sketch of an inventive wind turbine comprising three inventive rotor blades.

DETAILED DESCRIPTION

Figure 1:
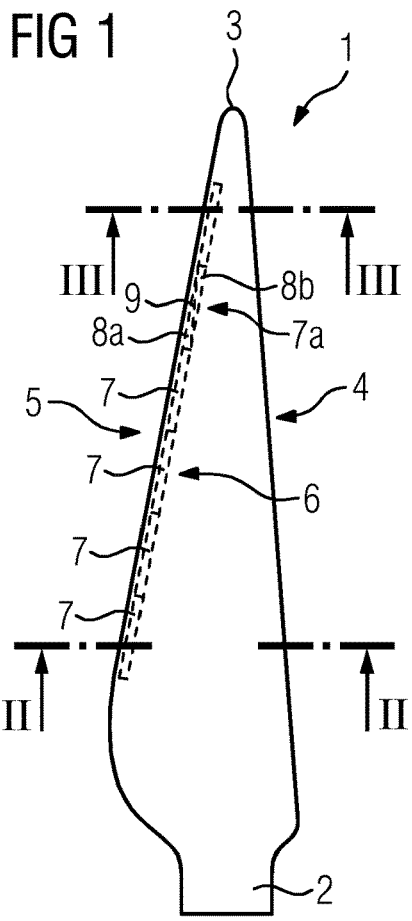
FIG. 1 is a principle sketch of an inventive rotor blade.

FIG. 1 shows an inventive rotor blade 1, made as an integral one-piece blade. It comprises a root 2 having a cylindrical cross section. The blade 1 is attached to the hub at this root 2.

In a widely known manner the blade 1, starting close to the root 2, widens and changes its cross section towards the tip 3, from a larger hollow structure in the section closer to the root 2 to a very flat air foil structure at the tip 3.

Furthermore, the rotor blade 1 comprises a leading edge 4 and a trailing edge 5 which roughly changes its design due to mechanical and aerodynamic reasons, as also commonly known.

For defining the respective trailing edge design, a trailing edge core 6 having several core elements 7, which are arranged side by side, seen from the root 2 to the tip 3, is inserted respectively laminated and infused in the one-piece rotor blade 1. These core elements 7 are made of a polymer, especially polyurethane. As already shown in FIG. 1, one of the core elements 7, here the core element 7a, is a split core element comprising two separate elements parts 8a, 8b, which are separated by a slit 9. This split core element 7a provides a transition region for transferring an inner laminate arranged at the inner side of the hollow blade 1 to becoming an outer laminate arranged at the outside of the blade 1.

Figure 2:
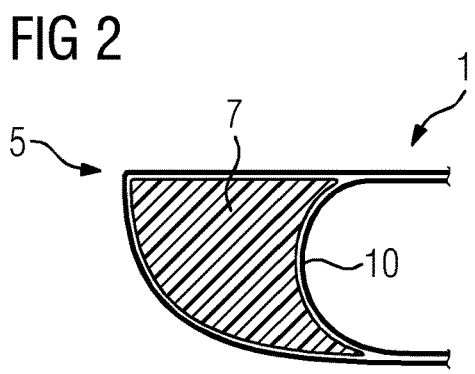
FIG. 2 is a principle sketch of a partial cross section of the rotor blade of FIG. 1 taken along the line II-II.

FIG. 2 shows a partial cross section of the rotor blade 1 at the trailing edge 5 taken along the line II-II. It shows one core element 7 defining the trailing edge 5 respectively the edge geometry. At the inside of the core element 7, which is curved at its inside, a laminate 10 being made of several layers of fiber mats, such as glass fiber mats, is arranged. The construction is then infused with a resin infusing the laminate 10 and the core element 7, which parts are firmly integrated respectively define the blade structure.

Figure 3:
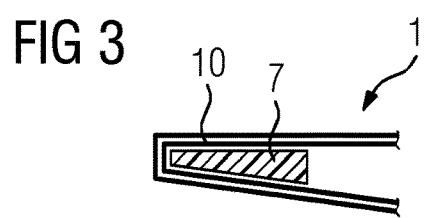
FIG. 3 is a principle sketch of a partial cross section of the blade of FIG. 1 taken along the line III-IIII.

FIG. 3 shows another principle sketch of a cross section at the trailing edge 5 taken along the line III-III of the rotor blade 1. While the cross section of FIG. 2 is taken, seen from the root 2, in a region in front of the split core element 7a, the cross section of FIG. 3 is taken in a region behind the split core element 7a. As is clearly shown in FIG. 3, the cross-section geometry has rapidly changed from the flat back geometry shown in FIG. 2 to an air foil geometry shown in FIG. 3. The core element 7 is very flat and small, compared to the core element 7 of FIG. 2. The laminate 10, which is now an outer laminate, is now arranged at the outside of the core element 7 respectively the blade. The transition from the laminate 10 being an inner laminate as shown in FIG. 2 to be an outer laminate as shown in FIG. 3 is realised without any discontinuity by means of the split core element 7a, as will now be described.

Figure 4:
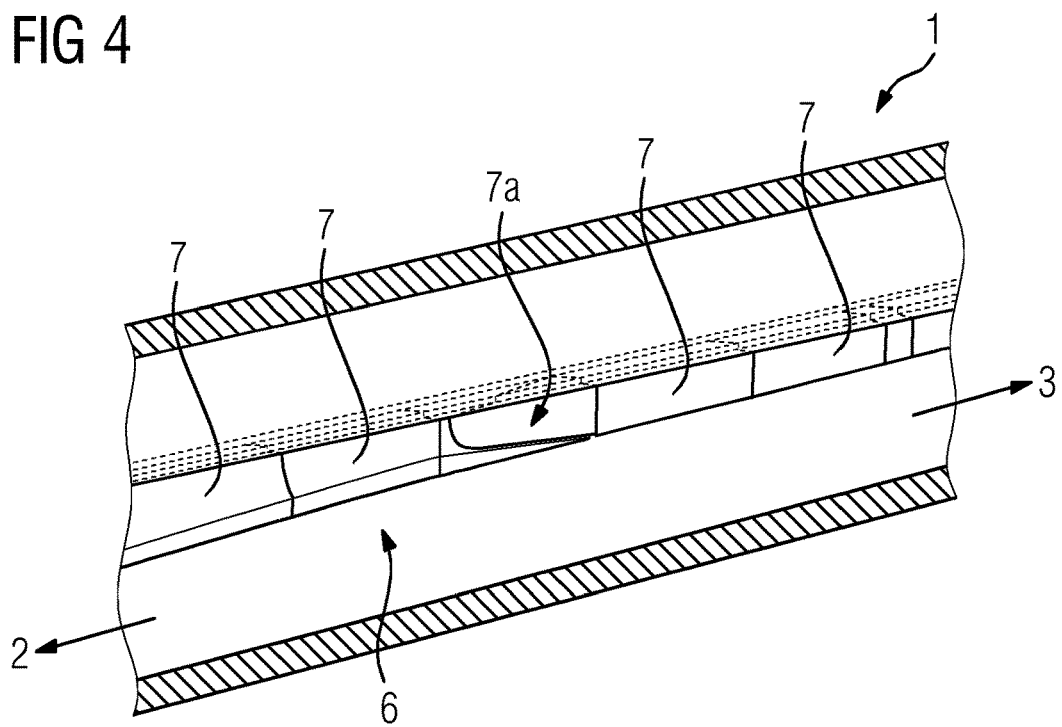
FIG. 4 is a principle sketch of a part of the rotor blade, seen from the inside of the blade, showing a part of the trailing edge core assembly with a split core element.

FIG. 4 shows as a partial principle sketch the rotor blade 1 from the inside of the hollow blade structure. The blade extends to the left towards the root 2, as shown by the arrow pointing to the left and by the reference sign 2 for the root 2, and extends to the right towards the tip 3, as shown by the arrow pointing to the right and the reference number 3.

The figure shows the trailing edge core 6 with the respective core elements 7 and the inventive split core element 7a, which core elements 7, 7a are arranged side by side. In the area to the left of the split core element 7a, the laminate 10 is arranged at the inside, i.e. at the surface shown in FIG. 4, while the laminate 10 is arranged at the outside of the blade in the region to the right of the split core element 7a.

Figure 5:
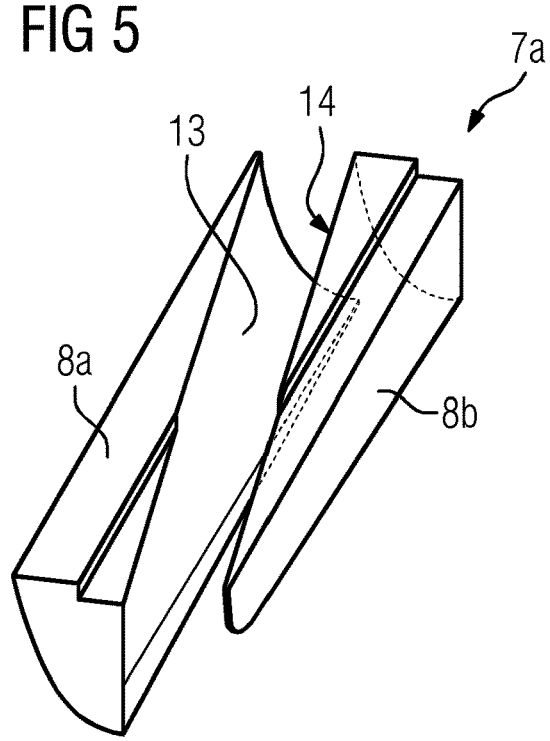
FIG. 5 is a perspective exploded view of the split core element with its two element parts.
Figure 6:
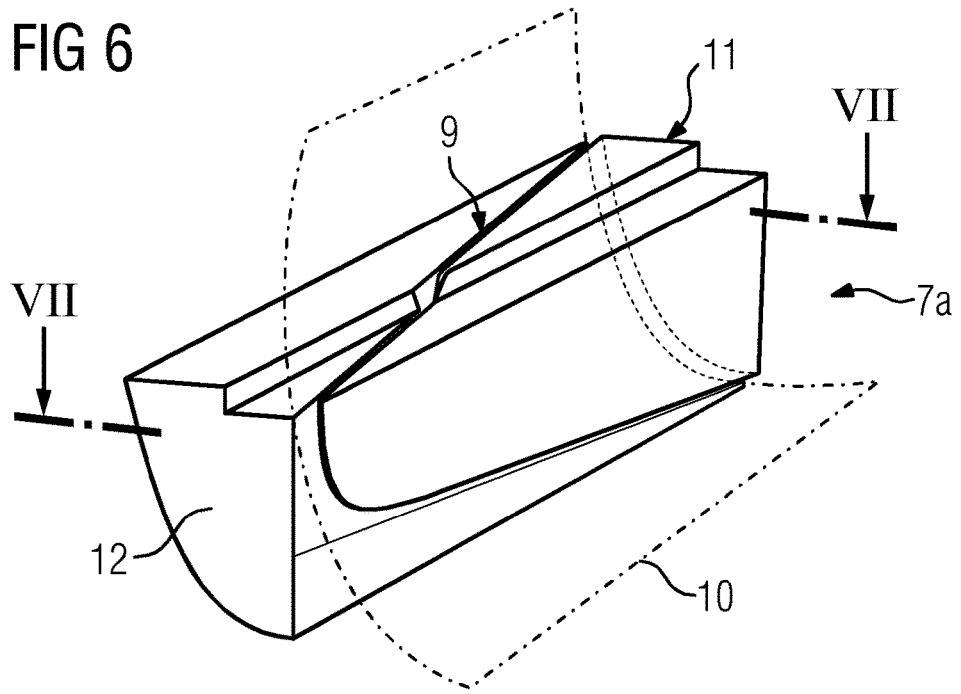
FIG. 6 is a perspective view of the split core element of FIG. 5 with the element part attached to each other.

The split core element 7a itself is shown in detail in the FIGS. 5 and 6. As already mentioned, the split core element 7a comprises two separate element parts 8a, 8b, which are separate from each other by means of a slit 9, when being installed in the blade 1. The slit 9 extends from close to one end surface 11 of the split core element 7a to the other end surface 12 and ends close to this end surface. It runs oblique to the longitudinal axis of the core element and is curved, i.e. the opposing surfaces 13, 14 of the element parts 8a, 8b are both curved and, from their geometry, correspond to each other, so that they are form-fitted to each other, as shown in FIG. 6. This ascertains that the laminate introduced into the slit and the resin matrix has the same thickness throughout the whole slit length and height.

The laminate 10 inserted into the slit 9 is shown in principle by the dashed line in FIG. 6. As is clearly shown, it transfers from the inner side to the outer side when it extends through the slit 9, seen in the longitudinal direction.

The slit core element 7a has a length of 0.5-2 m, especially of 1-1.5 m, thus also the slit has a comparable length.

Figure 7:
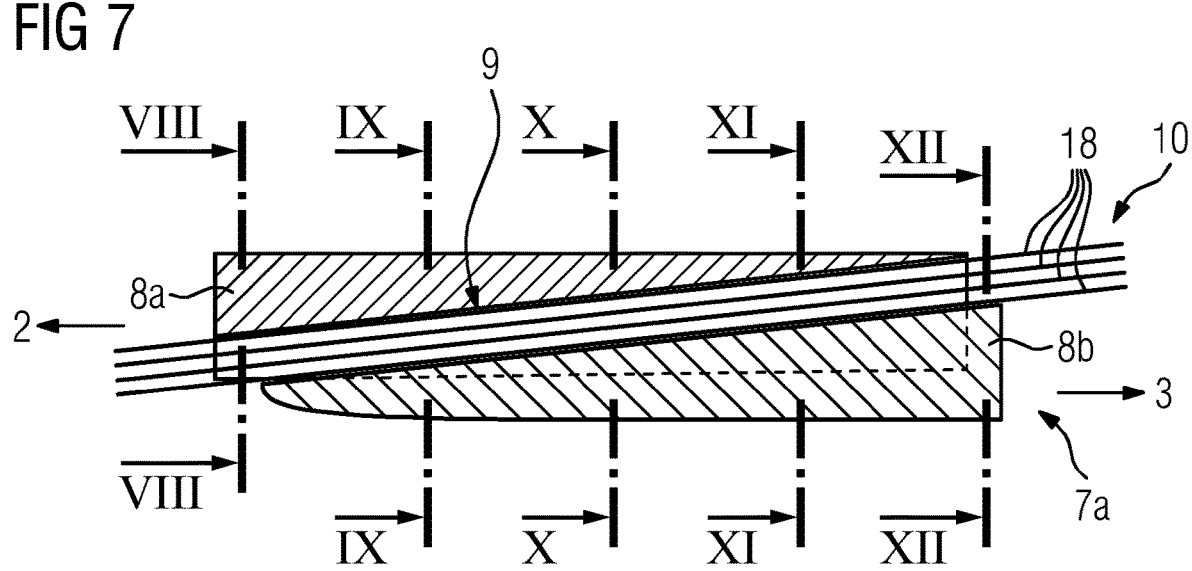
FIG. 7 is a principle sketch of a cross section of the split core element with the laminate inserted in the slit taken along the line VII-VII of FIG. 6.

FIG. 7 shows a principle sketch of a cross section taken along the line VII-VII of FIG. 6. It shows the split core element 7a with the element parts 8a, 8b and with the laminate 10 inserted into the slit 9. As can clearly be seen, a smooth and continuous transfer or transition of the laminate 10 from the inner side to the outer side can be realised. The laminate 10 is shown by means of several layers of fiber mats 18, such as glass fiber mats, with the whole arrangement being infused with a resin during the mould process, as commonly known.

Again, the direction to the left runs towards the root 2, while the direction to the right runs to the tip 3, as shown by means of the respective arrows pointing to the left and right and being marked with the reference numbers 2 and 3.

The FIGS. 8-12 show respective cross sections taken along the lines VIII-VIII to XII-XII as marked in FIG. 7. The cross section according to FIG. 8, being closer to the root than the cross section of FIG. 12 being closer to the tip, shows the split core element 7a, while the cross section is taken at a position, into which the slit 9 does not extend, see FIG. 7. The laminate 10 is an inner laminate 10a and is arranged at the inside of the blade respectively the core element 7a.

Figure 9:
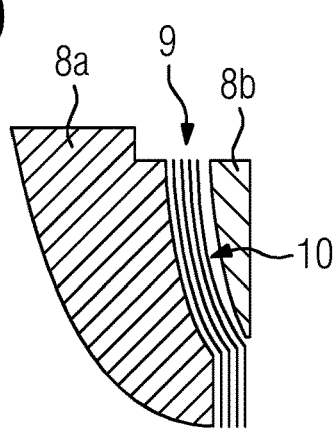
FIG. 9 is a principle sketch of a cross-section taken along the lines IX-IX in FIG. 7.

The cross section according to FIG. 9 is taken in a position, where the split core element 7a is already split respectively into which the slit 9 extends. As can clearly be seen, the laminate 10 is arranged in the slit and sandwiched between the element parts 8a, 8b.

Figure 10:
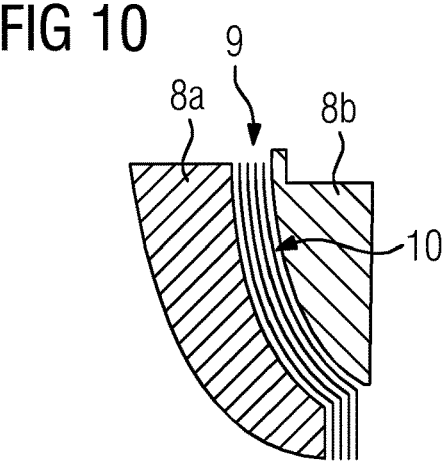
FIG. 10 is a principle sketch of a cross-section taken along the lines X-X in FIG. 7.

The cross section according to FIG. 10 is taken closer to the longitudinal middle of the split core element 7a. The geometry of the respective element parts 8a, 8b has changed due to the slit 9 running through the split core element 7a oblique to its longitudinal direction. Still the laminate 10 is in the slit 9 and sandwiched between both element parts 8a, 8b.

Figure 11:
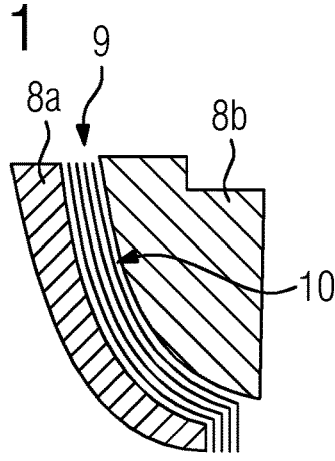
FIG. 11 is a principle sketch of a cross-section taken along the lines XI-XI in FIG. 7.

FIG. 11 shows a cross section, which is taken closer to the tip side end of the split core element 7a. Again, the geometry of the element parts 8a, 8b has changed, the laminate 10 is still inserted in the slit 9.

Figure 8:
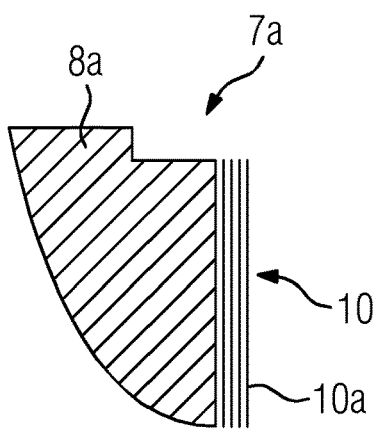
FIG. 8 is a principle sketch of a cross-section taken along the lines VIII-VIII in FIG. 7.
Figure 12:
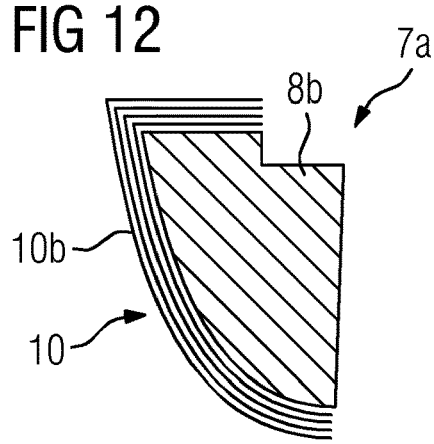
FIG. 12 is a principle sketch of a cross-section taken along the lines XII-XII in FIG. 7.

Finally, the cross section according to FIG. 12 is taken in an end area, into which, comparable to FIG. 8, the slit 9 does not extend. As is shown, the split core element 7a is in this part solely made by the element part 8b. The laminate 10 is now completely at the outside of the split core element 7a respectively the blade 1 and is an outer laminate 10b.

As shown by the FIGS. 7-12, the integration of the inventive split core element into the trailing edge core allows for a smooth transfer of the inner laminate 10a arranged at the inside to become the outer laminate 10b arranged at the outside without any mechanical discontinuity. This ascertains that higher loads, as shown by the arrows F in FIG. 7, can be taken also in this transition region. Thus the mechanical stability can also be maintained in the region running to the tip, where in the conventional art, due to the layer-by-layer-transfer by ramping the respective layers up and down and overlapping them seen from the inside to the outside, a mechanical discontinuity is given being negative for the overall mechanical properties of the blade.

Finally, FIG. 13 shows an inventive wind turbine 15 comprising a rotor 16 having three inventive rotor blades 1 attached to a hub 17.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine, with a trailing edge comprising a trailing edge core having several core elements arranged side by side, and with an inner and an outer laminate, wherein one core element is split into two element parts separated by a slit, whereby, seen in a direction from a blade root to a blade tip, the inner laminate runs into and through the slit and becomes the outer laminate.

2. The rotor blade according to claim 1, wherein the slit extends oblique to the longitudinal axis of the split core element.

3. The rotor blade according to claim 2, wherein the slit starts at or close to one end surface and extends to or close to the other end surface.

4. The rotor blade according to claim 1, wherein the split core element has a length of between one of 0.5 to 2 m, and 1 to 1.5 m.

5. The rotor blade according to claim 1, wherein the slit is curved.

6. The rotor blade according to claim 1, wherein the opposing surfaces of the two element parts correspond to each other in a form-fit manner.

7. The rotor blade according to claim 1, wherein the core elements are made of a polymer or wood.

8. The rotor blade according to claim 7, wherein the polymer is polyurethane.

9. A wind turbine, comprising a rotor with one or more rotor blades according to claim 1.

10. A rotor blade for a wind turbine, comprising:
a trailing edge including a trailing edge core having a plurality of core elements, and
an inner and an outer laminate,
wherein the plurality of core elements includes a split core element having two element parts separated by a slit extending oblique to a longitudinal axis of the split core element, and
wherein the inner laminate runs into and through the slit and becomes the outer laminate.

11. The rotor blade according to claim 10, wherein the slit is curved.

12. A rotor blade for a wind turbine, comprising:
a trailing edge including a trailing edge core having a plurality of core elements, and
an inner and an outer laminate,
wherein the plurality of core elements includes a split core element having two element parts separated by a curved slit, and wherein the inner laminate runs into and through the curved slit and becomes the outer laminate.

13. The rotor blade according to claim 12, wherein the curved slit extends oblique to a longitudinal axis of the split core element.

* * * * *